G. W. Feltes,
Spoke Lathe.
No. 76,733. Patented Apr. 14, 1868.
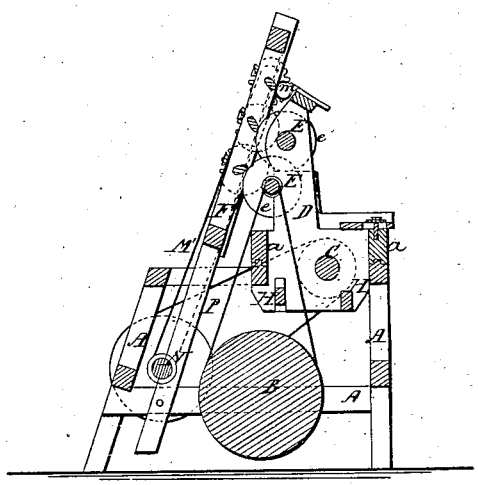
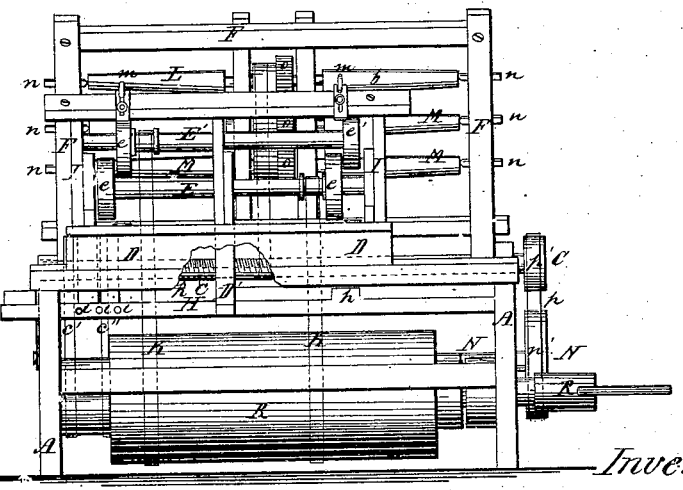

United States Patent Office.

GEORGE W. FELTES, OF CARBONDALE, ILLINOIS.

Letters Patent No. 76,733, dated April 14, 1868.

IMPROVEMENT IN WOOD-LATHES.

The Schedule referred to in these Letters Patent and making part of the same.

TO ALL WHOM IT MAY CONCERN:

Be it known that I, GEORGE W. FELTES, of Carbondale, in the county of Jackson, and State of Illinois, have invented a new and useful Improvement in Spoke-Machines; and I do hereby declare the following to be a full, clear, and exact description of the same, reference being had to the accompanying drawings, forming part of this specification, and in which—

Figure 1 is a longitudinal vertical section of my invention.

Figure 2 is a top view of the same.

Figure 3 is a section of the screw-shaft C, showing the pulleys $x$ $x'$ $x''$.

Similar letters of reference indicate corresponding parts in the several figures.

In this machine the spokes are placed in a movable frame, and held against the knives. The latter are attached to revolving wheels borne backward and forward by a carriage worked with a screw.

In order that others skilled in the art to which my invention appertains may be enabled to make and use the same, I will proceed to describe it in detail.

In the drawings, A A represent parts of the frame of my machine. B is the main working-shaft and belt-drum. C is the screw-shaft, the revolutions of which move the carriage D back and forth along the track $a$ $a$. E E' are shafts bearing wheels $e$ $e'$, attached to the peripheries of which are the cutting and planing-knives. F is a frame hinged at its bottom like the lathe of a loom, and bearing the spokes and the models, with the apparatus for revolving them.

The power is applied at the shaft B, and from that communicated first to the screw-shaft C by means of one of the belts $c$ $c'$, the belt, $c$, carrying the shaft C in one direction, and the belt, $c'$, carrying it in the opposite direction, thus causing the carriage D to move back or forth, according as the one belt or the other is working.

The working of the belts is regulated by the following-described device: Three pulleys, $x$ $x'$ $x''$, are placed on the shaft C, near its end, the middle one fixed firmly to the shaft; the others, revolving loosely upon the middle pulley $x'$, will, therefore, work the shaft C for the time being.

Alongside of the shaft are two rods H H', having shoulders or pins $h$ $h$, against which the fixed post D' of the carriage strikes as it reaches the end of its movement in either direction, sliding the rod which it strikes, a short distance along with the carriage. Other pins, $i$ $i'$ $i''$, upon the rods H H', engage with the belts $c$ $c'$, and when the rod H is pushed along by the carriage, its pins $i$ $i$, between which the belt $c$ runs, move that belt off of the pulley $x'$ on to the idle pulley $x''$, and move the belt $c'$, which is crossed from the idle pulley $x$ on to the working pulley $x'$, which changes the direction of revolution of the screw-shaft, and brings the carriage D back to where it started. When at that point, the other rod, H', reverses the position of the belts, and the motion of the shaft C again, and so on. The male screw of the shaft C working in a female screw in the arm D' projecting downward from the carriage, is the means by which motion is communicated from the shaft to the carriage.

The shafts E E', bearing the cutting-wheels $e$ $e'$, bear on journals in boxes in posts I I I attached to the carriage, and receive their motion from the main shaft B by means of the belts K K.

L L are the models of the spokes to be manufactured, bearing against the trucks $m$ $m$ on the upper part of the carriage-frame. M M are pieces of wood which are to become spokes by the operation of this machine. They are all held by the spindles $n$ $n$ $n$ $n$, and caused to revolve by the belt M' running from the shaft N, their motions being connected together by the cog-wheels $o$ $o$ $o$.

The shaft N' receives its motion from the screw-shaft C by means of a belt, $p$, and pulleys $n'$ and $p'$. The size of the various pulleys is so adjusted that when the machine is in operation the cutting-wheels $e$ $e'$ will have a very rapid motion, and the screw-shaft C, the shaft N, and the models and spoke-sticks a slow motion.

The frame F, hinged at its bottom, is pressed towards the carriage by the springs P P or their equivalents. It is evident that the shape of the spokes formed from the sticks M M will be conformed to that of the models L L, the frame F which holds the spoke-sticks approaching or receding from the cutting-knives according to the form of the models where they bear against the guiding-trucks m m. In this way the spokes may be cut in any desired form.

Any number of shafts E E' and spoke-sticks may be employed, and as large a number of spokes manufactured at once as may be desired.

In connection with the two models L L, arranged and operated as described, I claim the arrangement of a series of revolving shafts, E E', each bearing two cutting-instruments, one at each end of the shaft, the shafts being held in a sliding frame, which allows the cutters on one end of the series to operate upon a series of sticks parallel to one model, while those on the other end of the series operate on another series of sticks parallel to the other model, whereby any number of spokes, M M M M, may be made simultaneously in a single machine.

GEORGE W. FELTES.

Witnesses:
W. L. JOHNSON,
JAMES C. THOMPSON.